May 23, 1967   D. P. TUFFNELL ETAL   3,321,084
LIQUID FILTER ASSEMBLIES
Filed Feb. 7, 1963
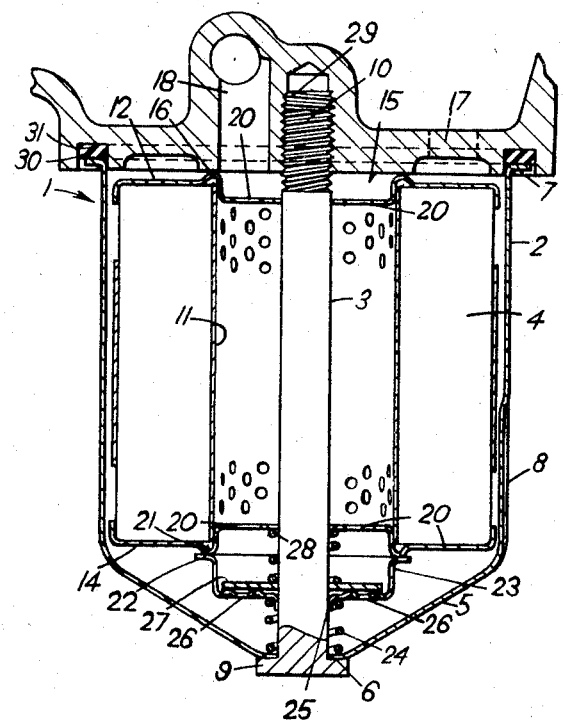
INVENTORS
Derrick Percival Tuffnell &
Kenneth Ernest Buckman
BY
George E. Johnson
Attorney 3,321,084
LIQUID FILTER ASSEMBLIES
Derrick Percival Tuffnell, North Baddesley, and Kenneth Ernest Buckman, Winsor, near Woodlands, England, assignors to General Motors Corporation, Detroit, Mich., a corporation of Delaware
Filed Feb. 7, 1963, Ser. No. 257,029
Claims priority, application Great Britain, Feb. 14, 1962, 5,651/62
1 Claim. (Cl. 210—232)

This invention relates to liquid filter assemblies and in particular to liquid filter assemblies, such as oil filters for internal combustion engines, in which the filter assembly is adapted to be secured direct to a mount face on an engine or other device with which the assembly is to be used, or to be secured to a mount face on a separate member which is mounted on the engine or device.

In a liquid filter assembly according to the invention a casing for the filter element comprises a cup-shaped shell having therein a coaxial stud one end of which is non-detachably secured to the base of the shell and the other end of which is threaded for engagement with a complementary threaded portion of a filter mount face so that the open end of the shell can be secured direct to said mount face by manual rotation of the casing.

The one end of the stud is preferably brazed or welded, for example by projection welding, to the base of the shell; it may be secured direct to the inside face of the shell base or may be enlarged at its extremity to form an annular flange by which the stud is brazed or welded to a central portion of the base around an opening through which the stud extends. The central portion may if desired be flattened.

The wall of the shell is formed with protruding ribs or like formations, or is roughened, as by the application of granular material in a paint or an adhesive applied to the exterior of the shell, in order to enable the shell to be firmly gripped by hand and screwed into position.

At its open end the edge of the shell is flanged or curled over outwardly or inwardly to provide a smooth surface for engagement with an annular gasket in the mount face to which the filter assembly is to be secured. For example, the gasket may be located in an annular groove machined in a flat mount face on a wall of an internal combustion engine, the mount face having oil inlet and outlet openings which are placed in communication with opposite sides of the filter element when the stud of the filter assembly is screwed into a tapped hole in the mount face.

The filter element may be of various forms but is preferably an annular element made of pleated paper; and a spring mounted on the stud abuts at one end against the base of the shell and at its other end against an end cap on the filter element or against intermediate members so as to press the other end of the element into engagement with the mount face when the filter assembly is secured thereto.

The scope of the invention is defined by the appended claim; and the invention and the method by which it is to be performed are hereinafter particularly described with reference to the accompanying drawing in which the single figure is a sectional elevation of an oil filter assembly mounted on a mount face of an internal combustion engine.

The embodiment of the invention shown in the drawing is an oil filter assembly 1 for attachment to a mount face on an internal combustion engine and comprises a combined casing and fixing stud 2, 3 and a annular filter element 4 made of pleated synthetic-resin impregnated filter paper.

The filter casing 2 is a cup-shaped shell of approximately 3" external diameter made of sheet steel of .034" in thickness. The shell has a conical base 5 with a central flat portion 6 with a coaxial hole therein. The angle included between the walls of the conical base portion is approximately 120°, that is, the base 5 slopes at an angle of approximately 60° to the axis of the shell 2.

The rim of the shell 2 is bent outwards to form an annular flange 7; and intermediate its ends the wall of the shell 2 is formed with a plurality of circumferentially spaced longitudinal ribs 8.

Mounted co-axially of the shell is the fixing stud 3 one end of which is of enlarged diameter to form an annular flange 9 which abuts the external surface of the flattened central portion 6 of the shell base 5. The annular flange 9 on the stud 3 is secured to the flattened end portion 6 of the base by brazing or projection or other welding; and the other end 10 of the stud is threaded and extends coaxially of and beyond the rim 7 of the open end of the shell 2.

The annular filter element 4 is made of pleated synthetic-resin impregnated paper and is mounted on a perforate support tube 11, annular end caps 12, 14 being sealed to either end of the element 4 and to the support tube 11.

The annular end cap 12 at one end of the element is adapted to abut a mount face 15 forming part of an internal combustion engine and is formed with an annular bead 16 which is adapted to engage the surface of the mount face 15 so as to place opposite sides of the filter element 4 in communication with oil inlet and outlet openings 17, 18 respectively in the mount face 15, the inlet and outlet openings 17, 18 forming part of the engine lubricant circulation system. A gasket (not shown) may be interposed between the annular bead 16 and the mount face 15. Each of the end plates 12, 14 has a central opening which fits about the stud 3 of the shell 2, as well as one or more openings 20 therein between the portions thereof adjacent the stud 3 and the support tube 11.

The end plate 14 is formed with an annular bead 21, similar to the annular bead 16 on the end plate 12; and a peripheral flange 22 at the rim of a cup-shaped sheet metal pressing 23 is pressed into abutment with the bead 21 by means of a helical spring 24 which is mounted on the stud 3 in the base of the shell 2 and abuts at one end against the base of the shell and at its other end around a flanged neck portion 25 of the pressing 23. The base of the pressing 23 is formed with a pair of concentrically spaced annular beads between which is a circular series of holes 26. The cup-shaped pressing 23 forms in conjunction with the end plate 14 a housing for a valve having a valve disc 27 which is pressed by a helical spring 28 so as normally to abut a valve seat formed by the concentric annular beads in the base of the pressing 23 and close the valve ports formed by the holes 26. A gasket (not shown) may be interposed between the flanged rim 22 of the pressing 23 and the annular bead 21 on the end cap 14.

In order to secure the filter assembly 1 in position the shell 2 is gripped in the hand, the ribs 8 facilitating a firm grip on the shell and the assembly is then turned so as to screw the threaded end 10 of the stud 3 into a tapped hole 29 in the mount face 15, the flanged end 7 of the shell 2 thereby being brought into sealing contact with an annular gasket 30 located in an annular groove 31 coaxial with the opening 29 in the mount face. With the filter assembly firmly secured to the mount face by this operation the inlet and outlet openings 17, 18 are in communication with the exterior of the filter and the space within the support tube 11 respectively so that oil to be filtered passes from the inlet passage 17 through the filter element 4 from the exterior to the interior thereof and thence by way of the space within the support tube 11 to the outlet opening 18.

It is found that with such manual tightening of the filter assembly 1 an average torque of approximately 12 lbs./ft. is exerted and that with such a torque the seal between the shell 2 and the mount face 15 is effective to resist leakage at a pressure within the shell of approximately 300 lbs. per square inch. Thus the assembly has advantages compared with known filter assemblies in which is used a separate centre bolt, which can rotate relatively to the shell and requires tightening by the use of a spanner or like tool, since with such constructions it is necessary to ensure that the filter casing will withstand the considerably higher torque, which may be up to 35 lbs./ft. With such known constructions the filter casing therefore has to be made of substantially heavier gauge metal whereas the assembly according to the invention permits lighter gauge metal to be used with a consequent saving in cost of manufacture.

It will be understood that filter elements other than the pleated paper element shown can be employed in a filter assembly according to the invention, and that the casing 2 may be formed with means other than the ribs 8 to facilitate manual engagement during the operation of screwing on the filter assembly to the mount face; for example the outer surface of the casing 2 could be mechanically roughened; or sand or like gritty material could be secured by adhesive or paint to the outer surface of the casing 2.

The value disc 27 may be of metal, rubber or plastics material, or of metal with a facing of rubber or plastics material.

We claim:

A liquid filter assembly comprising a mount face, a stud and a cup-shaped shell coaxially arranged and forming with said mount face a filter casing, one end of said shell being closed and nonrotatably fixed with relation to one end of said stud to form a unitary structure, the other end of said shell having an open end defined by an annular flange on the shell, an annular filter element coaxial with said stud and having an outside diameter less than the inside diameter of said annular flange, means resiliently urging said filter element away from said closed end of said shell, the other end of said stud extending from said filter element, said mount face having a tapped hole therein, thread means on said other end of said stud for engagement with said tapped hole whereby said annular flange and filter element may be urged into and away from sealing relation with said mount face by rotation of said shell and stud, means on said shell for effecting said rotation of the latter with said stud by hand, and said shell being of sufficient wall thickness to withstand the torque applied thereto by said hand rotation.

References Cited by the Examiner

UNITED STATES PATENTS

| | | | |
|---|---|---|---|
| 2,287,344 | 6/1942 | Easton et al. | 210—443 X |
| 2,357,572 | 9/1944 | Baldwin | 210—440 |
| 2,473,727 | 6/1949 | Robertson | 210—440 X |
| 2,657,806 | 11/1953 | Launder | 210—443 |
| 2,669,359 | 2/1954 | Mankin | 210—443 |
| 2,888,141 | 5/1959 | Coates et al. | 210—443 X |
| 2,933,192 | 4/1960 | Gretzinger | 210—443 X |
| 2,983,336 | 5/1961 | Kolbe | 210—133 X |

FOREIGN PATENTS

| | | |
|---|---|---|
| 150,198 | 7/1937 | Austria. |
| 702,168 | 1/1954 | Great Britain. |

REUBEN FRIEDMAN, *Primary Examiner.*

HERBERT L. MARTIN, *Examiner.*

F. W. MEDLEY, *Assistant Examiner.*